No. 843,369. PATENTED FEB. 5, 1907.
R. C. SCHREIBER.
ROAD SMOOTHER.
APPLICATION FILED JULY 12, 1906.
2 SHEETS—SHEET 1.
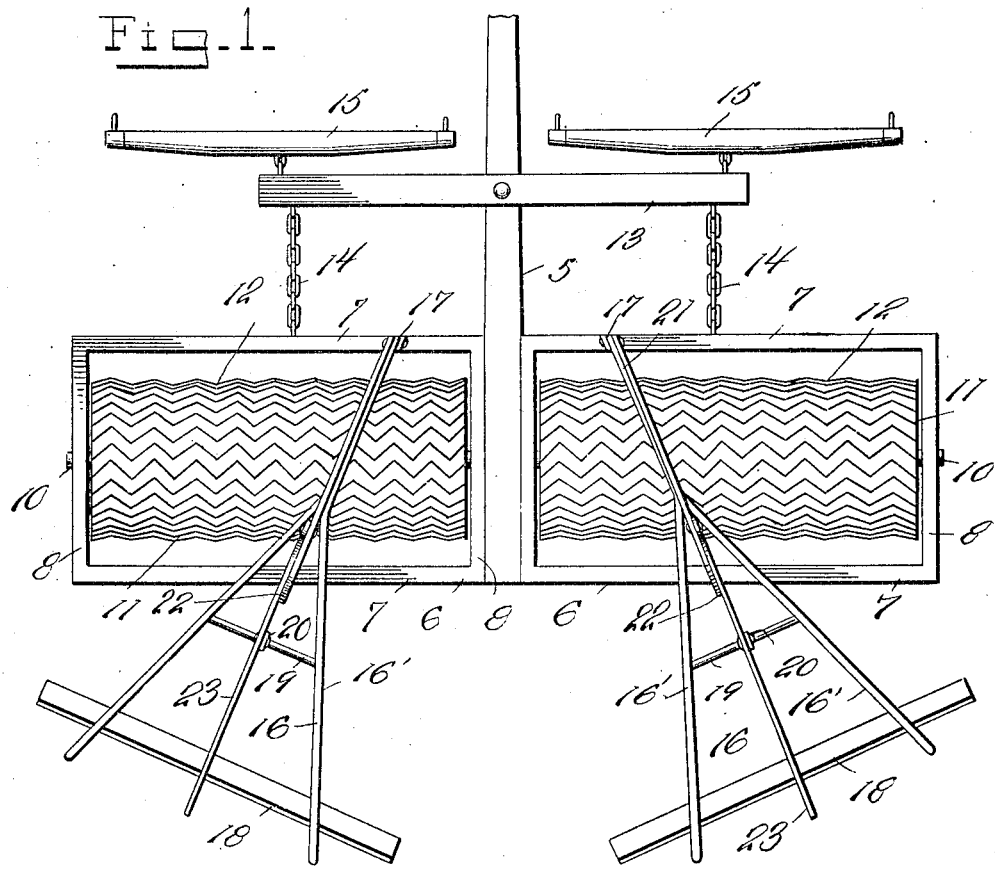
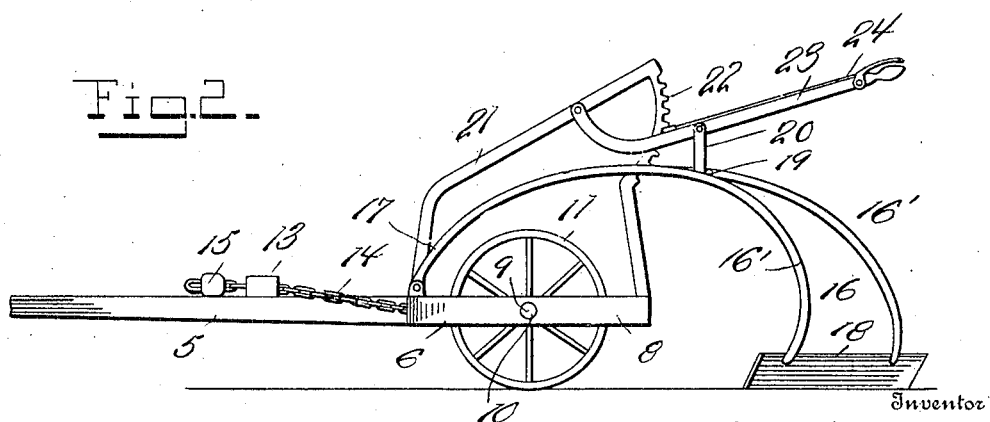

No. 843,369. PATENTED FEB. 5, 1907.
R. C. SCHREIBER.
ROAD SMOOTHER.
APPLICATION FILED JULY 12, 1906.
2 SHEETS—SHEET 2.
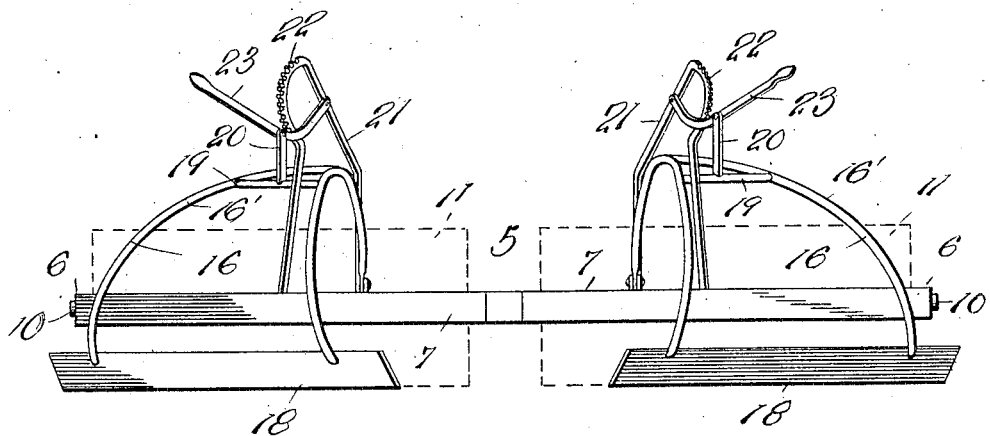
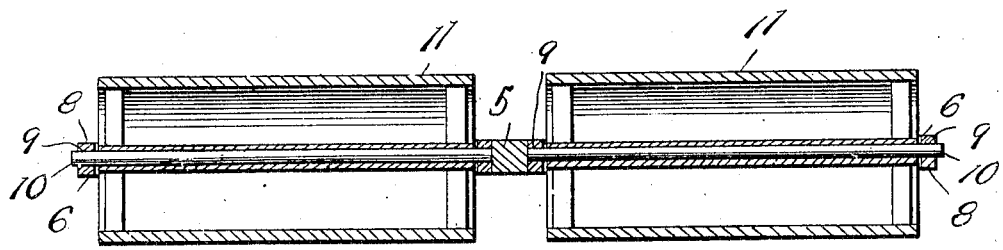
Witnesses
G. R. Thomas
H. E. Chandler
Inventor
R. C. Schreiber
By Chandler & Chandler
Attorneys

UNITED STATES PATENT OFFICE.

ROBERT C. SCHREIBER, OF FAIRMONT, MINNESOTA.

ROAD-SMOOTHER.

No. 843,369.      Specification of Letters Patent.      Patented Feb. 5, 1907.

Application filed July 12, 1906. Serial No. 325,954.

*To all whom it may concern:*

Be it known that I, ROBERT C. SCHREIBER, a citizen of the United States, residing at Fairmont, in the county of Martin, State of Minnesota, have invented certain new and useful Improvements in Road-Smoothers; and I do hereby declare the following to be a full, clear, and exact description of the invention, such as will enable others skilled in the art to which it appertains to make and use the same.

This invention relates to road-smoothers, and has for its object to provide a smoother which will both pack the road and scrape the loose surface-earth and roughneses therefrom, another object being to provide a smoother which will be simple and durable and which will include a novel arrangement of parts.

It is to be understood that I do not desire to be limited to the exact details of construction shown and described, for obvious modifications will occur to a person skilled in the art.

In the drawings forming a portion of this specification, and in which like numerals of reference indicate similar parts in the several views, Figure 1 is a top plan view of the present invention. Fig. 2 is a side elevation. Fig. 3 is a rear elevation. Fig. 4 is a longitudinal section on line 4 4 of Fig. 1, taken longitudinally of the drum.

Referring now to the drawings, there is shown a tongue 5, to the rearward end of which there are secured a pair of oppositely-extending horizontally-disposed rectangular frames 6, including front and rear members 7 and end members 8, the inner end members being secured to the tongue. Registering bearing-openings 9 are formed in the end members for the reception of axles 10, upon which are fixed presser-rollers 11, having series of peripheral calks 12, arranged in tortuous longitudinal lines. A whiffletree 13 is pivoted upon the tongue and has its ends connected with the forward members 7 of the frame 6 by means of chains 14, which thus limit the pivotal movement of the whiffletree, and singletrees 15 are carried by the ends of the whiffletree. Yokes 16 have stems 17, which are secured to the forward members 7 of the frames, the yokes being curved rearwardly and downwardly over the rollers and having the rearward ends of their legs secured to rearwardly-convergent scrapers 18, disposed to engage the ground in the rear of the rollers. The stems 17 are pivoted to the members 7 for vertical movement of the scrapers 18, and the legs 16' of the yokes 16 are connected by cross-pieces 19, having upwardly-extending rods 20 secured thereto. Rearwardly-extending arms 21 are secured to the forward members 7 of the frame and are curved to bring their rearward portions beyond the rollers, as shown, and depending rack-bars 22 are carried by the rearward ends of these arms. Levers 23 are pivoted to the arms 21 and to the rods 20 for vertical movement of the yokes and scrapers when the levers are moved, and a hand-operated latch mechanism 24 is carried by each lever 23 and arranged for engagement of the respective rack-bar 22 to hold the scraper in different positions with respect to the ground.

It will thus be seen that the rollers 11, which are of considerable weight, will press the ground which they pass over and that the calks 12 will crush the surface unevennesses to facilitate the scraping of the road by the scrapers 18, the latter being movable into and out of operative position, as will be readily understood.

What is claimed is—

1. A smoother comprising a tongue, oppositely-extending frames secured to the tongue, rollers journaled in the frames longitudinally thereof, scraper-supports pivoted to the frames forwardly of the rollers and extending rearwardly and downwardly thereover, scrapers secured to the supports in the rear of the rollers, arms secured to the frames, levers pivoted to the arms, connections between the levers and the scrapers for movement of the latter into and out of operative position when the levers are moved, and means for holding the levers at different points of their movement.

2. A smoother comprising a tongue, oppositely-extending frames secured at their inner ends to the rearward portion of the tongue in horizontal position, said frames including end members and forward and rear members, axles journaled in the end members, drums fixed upon the axles and having peripheral calks, stems pivoted to the forward members of the frames, yokes carried by the stems and extending downwardly and rearwardly beyond the frames, rearwardly-convergent scrapers carried by the yokes, cross members connected to the legs of each yoke, rods carried by the cross members, rearwardly-extending arms secured to the forward members of the frames, depending rack-bars carried by the rearward ends of the arms, levers pivoted to the arms and to the rods, for movement of the stems upon their pivots when the levers are moved to bring the scrapers into and out of operative position, and latches carried by the levers for engagement of the rack-bars to hold the scrapers at different points of their movement.

In testimony whereof I affix my signature in presence of two witnesses.

ROBERT C. SCHREIBER.

Witnesses:
 FRANK G. SASSE,
 FERD HAWKINS.